United States Patent [19]
Arbisi

[11] Patent Number: 5,316,368
[45] Date of Patent: May 31, 1994

[54] VEHICLE ACCESSORY

[75] Inventor: Thomas E. Arbisi, Holland, Mich.

[73] Assignee: Prince Corporation, Holland, Mich.

[21] Appl. No.: 875,076

[22] Filed: Apr. 28, 1992

[51] Int. Cl.⁵ .................................................. A47C 7/62
[52] U.S. Cl. ................................. 297/194; 248/311.2; 224/275
[58] Field of Search ................... 297/188, 194; 108/44; 248/311.2, 313, 293; 224/273, 275

[56] References Cited

U.S. PATENT DOCUMENTS

| | | | |
|---|---|---|---|
| 4,826,058 | 5/1989 | Nakayama | 224/275 X |
| 4,892,281 | 1/1990 | DiFilippo et al. | 248/311.2 |
| 5,024,411 | 6/1991 | Elwell | 248/311.2 |
| 5,096,152 | 3/1992 | Christiansen et al. | 224/275 X |
| 5,104,186 | 4/1992 | Kwasnik et al. | 248/311.2 X |
| 5,131,716 | 7/1992 | Kwasnik et al. | 297/194 |
| 5,171,061 | 12/1992 | Marcusen | 297/194 |
| 5,195,711 | 3/1993 | Miller et al. | 248/313 X |
| 5,205,452 | 4/1993 | Mankey | 224/275 |
| 5,253,838 | 10/1993 | Spykerman | 248/311.2 |

FOREIGN PATENT DOCUMENTS

| | | | |
|---|---|---|---|
| 3143957 | 5/1983 | Fed. Rep. of Germany | 297/194 |
| 2011793 | 7/1992 | World Int. Prop. O. | 248/311.2 |

Primary Examiner—Peter M. Cuomo
Assistant Examiner—Suzanne L. Dino
Attorney, Agent, or Firm—Price, Heneveld, Cooper, DeWitt & Litton

[57] ABSTRACT

A vehicle accessory such as an armrest includes a base having an open compartment, a cover pivotally mounted to the base for covering the compartment, and a transferably mounted drawer movable between a retracted storage position so that the drawer is retained on the cover, and an extended use position so that the drawer is retained on the base. The base and cover include a latching system that releases the drawer permitting movement of the drawer when the cover is closed, but preventing removal of the drawer from the cover when the drawer is in the stored position and the cover is open. In a preferred embodiment, the drawer includes a container holder therein.

21 Claims, 5 Drawing Sheets

VEHICLE ACCESSORY

BACKGROUND OF THE INVENTION

The present invention relates to a vehicle accessory such as an armrest or console and in particular to a container holder drawer for such an accessory.

Armrests are a convenient location for the mounting of container holders and as a result are often used to support container holders which are frequently movably mounted to the armrests for movement between use and storage positions. In particular, many armrests include an interior compartment with a cover, and the container holders are adapted to move into and out of a front portion of the compartment. U.S. Pat. No. 5,087,008 shows two examples of such construction, one being a slidable drawer (FIG. 1), and another being a pivotable member (FIG. 7). While this provides an aesthetic appearance with the container holder in the storage position, the container holder reduces access to the compartment when in the storage position, and also when stored is subject to being damaged or soiled by items placed in the compartment. In addition to reducing access to the interior of an armrest storage area, a container holder which is stored in the storage compartment of an armrest uses valuable storage space in the compartment which could otherwise be used for storage of other items.

SUMMARY OF THE INVENTION

The present invention includes a vehicle accessory such as a console or an armrest having a base defining an open compartment, a cover pivotally mounted to the base for covering and uncovering the compartment, and a drawer transferably mounted between the base and the cover. The drawer is transferably movable between a storage position so that the drawer pivots open with the cover to fully expose the compartment, and a use position such that the drawer remains in an extended position stationary with the base but allows the cover to open.

The preferred embodiment of the present invention includes several advantages over known art. When the drawer is moved to a use position such as for holding a container, the drawer is retained in the extended use position on the base but is released from the cover so that an operator can open the cover to access the compartment in the base. Contrastingly, with the drawer in the retracted storage position, the drawer is retained by the cover so that if the cover is opened, the drawer opens with the cover and the compartment is still fully accessible. Further, the drawer occupies a position in the cover so that a minimum of useable space in the compartment is wasted. Still further, the preferred embodiment includes a positive latching system that automatically retains the drawer in the desired position when the cover is moved between use and closed positions.

These and other features, objects, and advantages of the invention will be further understood and appreciated by those skilled in the art by reference to the following written specification, claims, and appended drawings.

BRIEF DESCRIPTION OF THE DRAWINGS

FIG. 11 is an enlarged, fragmentary, cross-sectional view taken along section line XI—XI in FIG. 9;

FIG. 12 is a fragmentary, top plan view of the armrest with the cover closed on the base and the drawer retracted to the storage position;

FIG. 13 is a fragmentary, top plan view of the armrest with the cover closed on the base and the drawer extended to the use position;

BRIEF DESCRIPTION OF THE PREFERRED EMBODIMENTS

Figure 1:
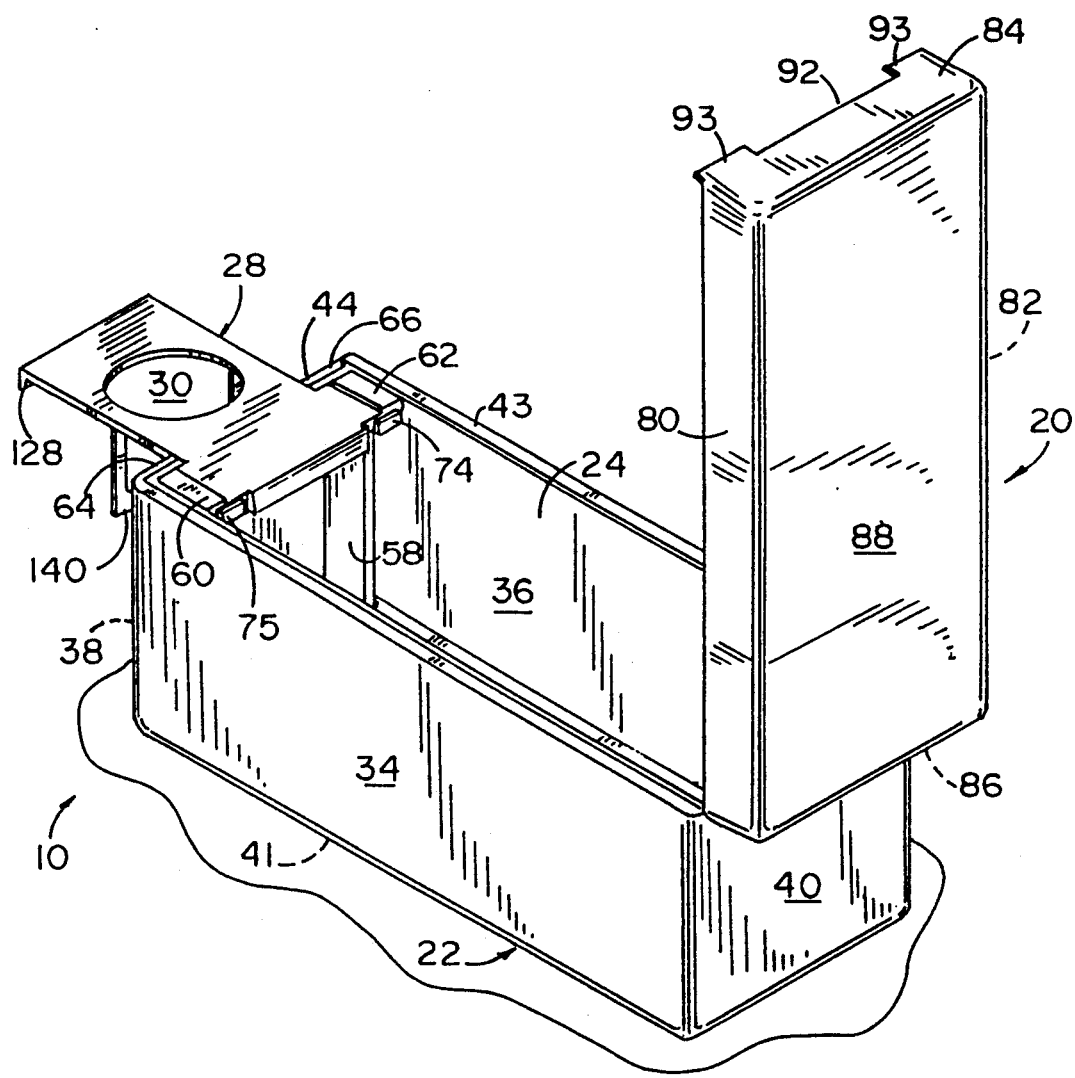
FIG. 1 is a rear perspective view of a vehicle armrest or console including a drawer embodying the present invention shown in the extended use position on the base with the cover being shown in the open position.

An armrest or console 20 (FIG. 1) is mounted in a vehicle 10 such as an automobile and in the center of the front seat area typically between the driver and passenger seats. For purposes of describing unit 20 it will be identified as an armrest although the container can be integrated in a console or other vehicle accessory. Armrest 20 includes a base 22 having an interior compartment 24, a cover 26 pivotally mounted to base 22 for covering the compartment 24, and a drawer 28 transferably mounted between the base 22 and cover 26. With cover 26 closed, drawer 28 is movable between a retracted storage position so that drawer 28 is retained in cover 26 and an extended use position so that drawer 28 is retained by base 22 as seen in FIGS. 12 and 13, respectively, and in the sectional Figs. thereof. Base 22 and cover 26 include a positive latching system that releases drawer 28 permitting movement of the drawer 28 when cover 26 is closed, but preventing movement of the drawer 28 when cover 26 is open. In a preferred embodiment, drawer 28 includes an aperture 30 for holding a container (not shown), although it is contemplated drawer 28 can include various devices to be selectively accessed.

Figure 5:
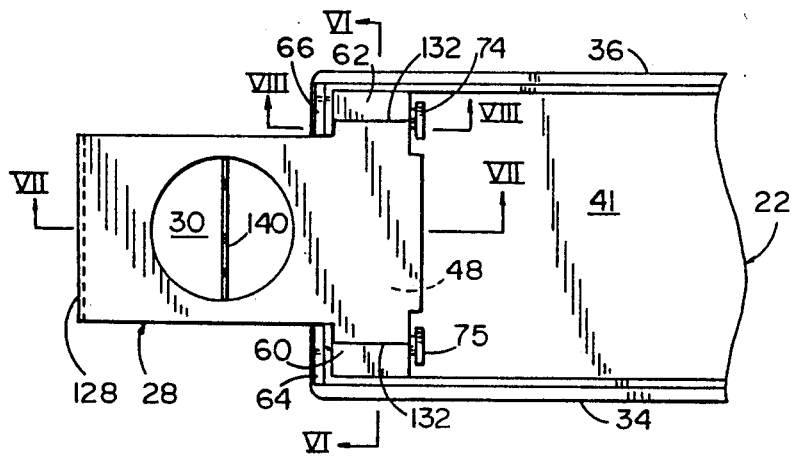
FIG. 5 is a fragmentary plan view of the armrest base and drawer with the drawer in the extended use position as shown also in FIG. 1.

Base 22 (FIGS. 1 and 2) includes sidewalls 34 and 36, a front wall 38, a rear wall 40, and a bottom 41 defining an open compartment 24 having a generally rectangular shape. The exterior surface of walls 34, 36, 38 and 40 is upholstered with a cloth-covered foam material 43 or other material to aesthetically match the interior trim of the vehicle passenger compartment. Front wall 38 includes a centrally located slot 44 in the top thereof which is defined by and extends between tabs 64 and 66 that extend laterally inwardly from sidewalls 34 and 36 and serve as stops for drawer 28, as best seen in FIG. 5. Slot 44 is of sufficient width and height to receive the body of drawer 28 therethrough.

Figure 2:
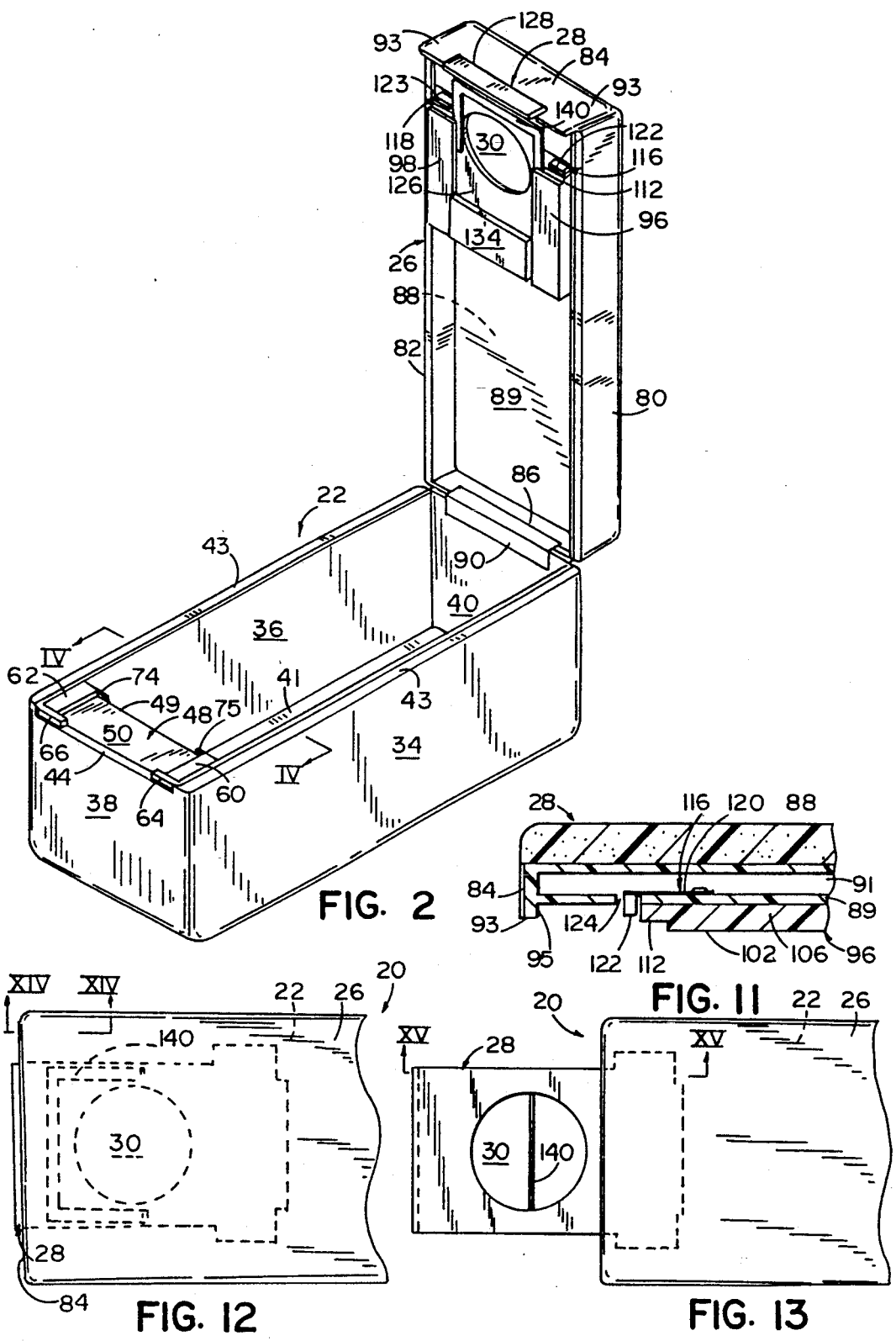
FIG. 2 is a front perspective of the armrest shown in FIG. 1, but with the drawer being shown in the retracted storage position on the cover with the cover being shown in the open position.

A platform or shelf 48 (FIGS. 2 and 4-8) extends rearwardly from front wall 38. Platform 48 includes an upper surface 50 defining a rearwardly facing rear lip 49, a lower surface 52, and a rear surface 54. Platform 48 is supported at spaced intervals by braces 56 and 58 which are spaced inwardly from sidewalls 34 and 36, respectively, and extend from the lower surface of platform 48 downwardly to floor 41 as best seen in FIGS. 1, 4, 6 and 7. Also, platform 48 is supported by the connection of its opposite ends to the sidewalls 34 and 36. Two generally rectangular guide blocks 60 and 62 extend upwardly from platform 48 above upper surface 50 adjacent sidewalls 34 and 36 and are spaced apart a distance less than the spacing of stop tabs 64 and 66. Guides 60 and 62 have a thickness that is approximately equal to the thickness of the body of drawer 28 which extends between the guides with the T-shaped end of the drawer 28 abutting the guides with the drawer fully extended as seen in FIG. 1.

Cover 26 (FIG. 1) includes sidewalls 80 and 82, a front wall 84, a rear wall 86, and a top wall 88 covered on their exterior surface with a cloth-covered foam material or other material similar to base 22. Cover 26 (FIGS. 9-11) includes a "false" wall or second wall 89 which is attached to walls 80, 82, 84 and 86 in spaced relationship below top wall 88 to define a recess 91 therebetween.

Figure 16:
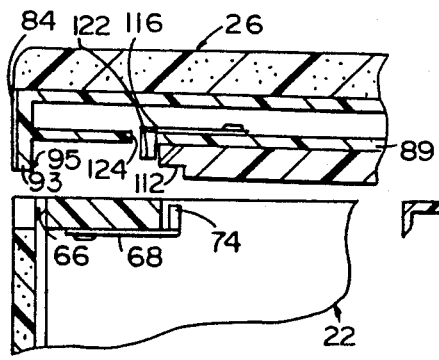
FIG. 16 is a fragmentary cross-sectional view comparable to that shown in FIG. 14, but with the cover being shown in a partially open position and the latches being shown in a latched position.

Cover 26 (FIG. 2) is pivotally connected to base rear wall 40 by hinge 90 which attaches to cover rear wall 86. When closed, cover sidewalls 80 and 82 align with base sidewalls 34 and 36 so that the cover 26 encloses compartment 24. The front wall 84 of cover 26 also includes a slot 92 defined by tabs 93 on front wall 84 that aligns with slot 44 of the armrest body when the cover 26 is closed to provide an opening for receiving the body of drawer 28. Tabs 93 (FIGS. 14 and 16) overlap into the recessed exterior surface of base front wall tabs 64 and 66, as seen also in FIG. 2. The tabs 93 include detents such as detents 95 or other means to frictionally hold cover 26 closed on base 22.

Figure 10:
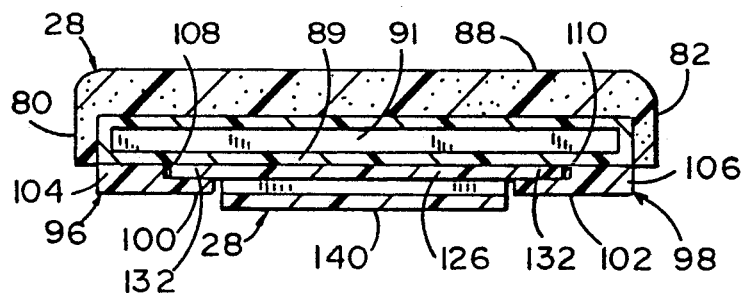
FIG. 10 is an enlarged, fragmentary, cross-sectional view taken along section line X—X in FIG. 9.

A pair of drawer holding, L-shaped elongated brackets 96 and 98 (FIGS. 2, 10, 11 and 14) attach to cover sidewalls 80 and 82 so that they extend downwardly into compartment 24 when cover 26 is closed. In particular, L-shaped brackets 96 and 98 include standoffs 104 and 106 which are spaced in parallel relationship and aligned with guides 60 and 62 when cover 26 is closed. Brackets 96 and 98 further include inwardly extending legs 100 and 102 that have upper surfaces which align with surface 50 of platform 48 when the cover 26 is closed such that drawer 28 can smoothly transfer from being supported by platform 48 when extended to brackets 96 and 98 when retracted. The combination of L-shaped brackets 96 and 98 adjacent cover top wall 88 creates an inwardly facing pair of slots 108 and 110 that align with slot 92 in cover 26 and with slot 44 in base 22 when cover 26 is closed. The standoffs 104 and 106, as seen in FIG. 10, extend forwardly of legs 100 and 102 of the brackets 96 and 98, respectively, forming latch engaging ends 112. When the cover 26 is closed, these ends 112 depress the tips 74, 75 of spring-biased latches 68 to allow the rear edge 130 of drawer 28 to clear the latch tips 74 and 75 and thereby be retracted into the compartment of the armrest.

Figure 3:
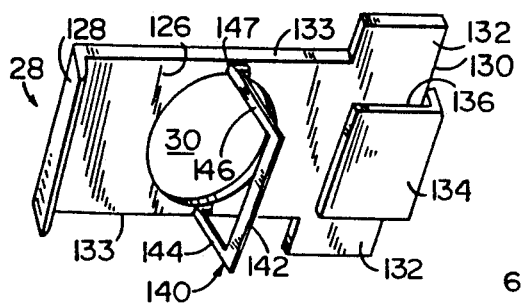
FIG. 3 is a bottom perspective view of the drawer.

Drawer 28 (FIG. 3) includes a planar body 126 with a centrally located aperture 30 for holding containers therein. A downwardly depending ledge defines a finger grip 128 located on the forward edge of body 126 to provide a means for pulling drawer 28 outwardly. Grip 126 also acts as a stop to prevent drawer 28 from being pushed rearwardly in the slots 44 and 92 past front walls 38 and 84, respectively, and into armrest 20. The trailing end 130 of body 126 includes opposing, laterally extending wings or tabs 132 which extend laterally outwardly from side edges 133 of body 126. Tabs 132 and also side edges 133 of the drawer extend into the slots 108 and 110 when drawer 28 is in the closed storage position as seen in FIG. 10. Tabs 132 slide forwardly to an end position on upper surface 50 of platform 48 between guides 60 and 62 and against the inside surface of tabs 60 and 62 when drawer 28 is moved to the extended use position as seen in FIG. 1. Simultaneously, aperture 30 is positioned in front of front walls 38 and 84 and exposed for use.

The rear edge 130 of drawer 28 (FIG. 3) includes a forwardly extending hook-like tab 134 that extends downwardly and forwardly from the rear edge of end 130 and engages the underside of platform 48 to prevent the drawer from tilting when in a use position as seen in FIG. 1. Thus the slot 136 defined by tab 134 receives the rear lip 49 of platform 48 as drawer 28 is slid forwardly. A U-shaped bail 140 is pivotally attached to the bottom of drawer 28, a cross bar 142 and two perpendicularly extending thin-walled arms 144 and 146 connected to cross bar 142. Arms 144 and 146 pivotally attach at their free ends to drawer body 126 on opposite sides of aperture 30 by a living hinge 147 as shown, or by other means such as a pivot pin or the like. As drawer 128 is extended, bail 140 drops downwardly by gravity to a use position under aperture 30 for supporting the bottom of a container placed in the aperture. As drawer 28 is retracted, arms 144 and 146 abuttingly engage base front wall 38 causing bail 140 to raise to a folded position adjacent and under drawer 28 within armrest 20 and between cover 26 and base 22. The outer edges 147 of arms 144 and 146 engage slots 108 and 110 so that bail 140 continues to be held in a folded position adjacent cover 26 when cover 26 is opened.

Figure 4:
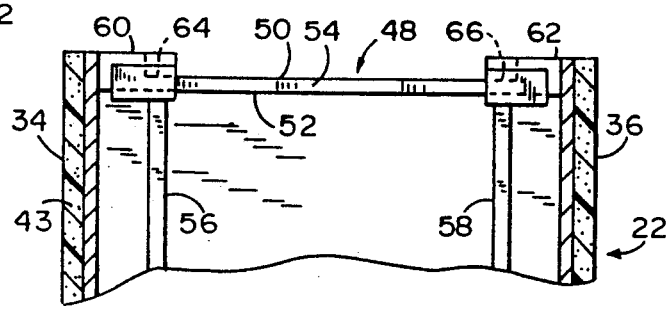
FIG. 4 is an enlarged, fragmentary, cross-sectional view taken along section line IV—IV in FIG. 2.
Figure 6:
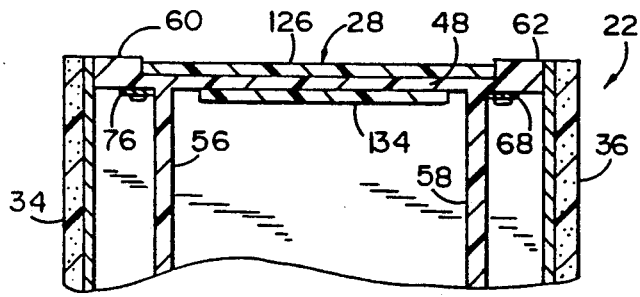
FIG. 6 is an enlarged, fragmentary, cross-sectional view taken along section line VI—VI in FIG. 5.
Figure 7:
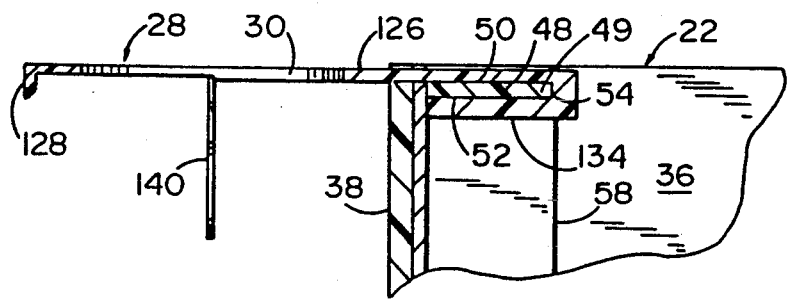
FIG. 7 is a fragmentary, cross-sectional view taken along section line VII—VII in FIG. 5.
Figure 8:
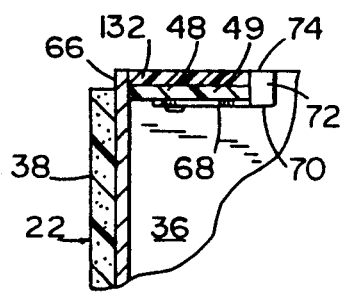
FIG. 8 is a fragmentary, cross-sectional view taken along section line VIII—VIII in FIG. 5.

A pair of latches are attached to platform 48 for positively retaining drawer 28 in the extended use position on base 22 when cover 26 is opened (FIGS. 4-8). The latches each include a leaf spring 68 (FIG. 8) which is attached at one end by a conventional fastener to the lower surface 50 of platform 48 at a location between brace 58 and sidewall 36 (FIG. 6). Leaf spring 68 includes a rearwardly extending free end 70 that extends rearwardly of platform rear lip 49 (FIG. 8). A protrusion or catch 72 extends upwardly from free end 70 and defines a tip 74 that extends above platform upper surface 50 when not held in a depressed position, as described below. Further, tip 74 has a width sufficiently large so that tip 74 extends from near sidewall 34 to a location inwardly of guide 62 (FIGS. 4 and 5). Leaf spring 68 is sufficiently long and resilient so that tip 74 can readily be depressed below upper surface 50 of platform 48, but sufficiently stiff so that tip 74 is dependably biased upwardly into position above platform rear lip 49 and adjacent guide 62 when released. A second leaf spring 76, similar to leaf spring 68, is similarly attached to the underside of platform 48 but between brace 56 and sidewall 34. Second leaf spring 76 includes a tip 75 similar to tip 74 of leaf spring 68.

Ends 112 (FIGS. 14 and 15) of L-shaped brackets 96 and 98 are located on cover 26 so as to engage an outer edge of tip 74 as the cover 26 is pivoted downwardly over the tips when closed. Thus, ends 112 force catch tips 74 and 75 below platform 48 whenever cover 26 is closed. With the cover 26 closed, upper catches 116 and 118 (FIG. 9) are also released as noted below, and drawer 28 can be moved forwardly to the extended use position with drawer tabs 132 being allowed to slide fully out of slots 108 and 110 onto platform 48. With drawer 26 in the extended use position, tabs 132 abut the inside surface of tabs 64 and 66 of front wall 38. If cover 26 is then opened and catch tips 74 and released (FIGS. 16 and 17), tips 74 and 75 rise to a level so that tabs 64 and 66 are positively trapped against front tabs 60 and 62. Due to hook-like tab 134 on drawer 28 engaging platform 48 (FIG. 7), drawer 28 is held in the extended use position in cantilever fashion until cover 26 is once again closed.

Figure 9:
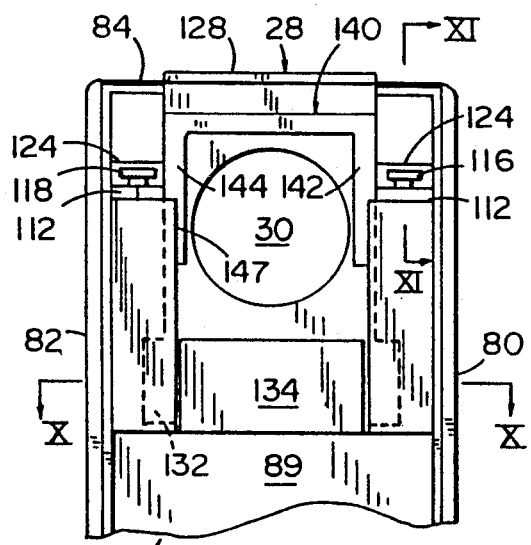
FIG. 9 is a fragmentary, bottom plan view of the armrest cover and drawer with the drawer in the retracted storage position as shown in FIG. 2.
Figure 14:
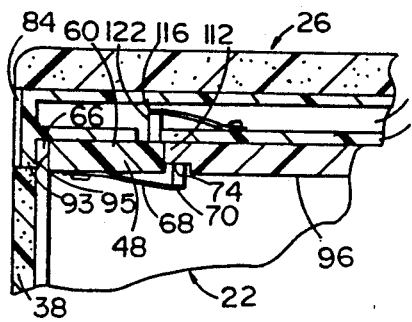
FIG. 14 is a fragmentary, cross-sectional view taken along section line XIV—XIV in FIG. 12 showing the latches being held in an unlatched position.
Figure 15:
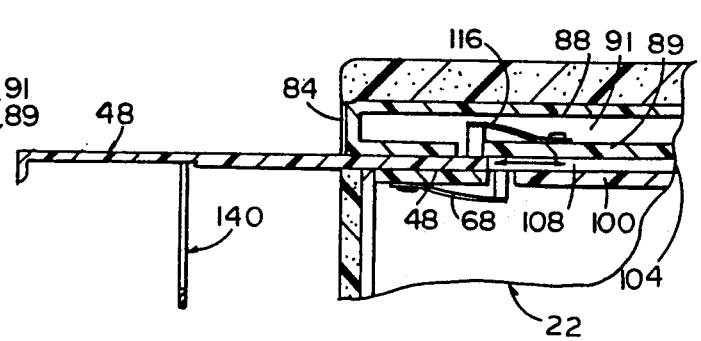
FIG. 15 is a fragmentary, cross-sectional view taken along section line XV—XV in FIG. 12, with the drawer being shown in the extended use position and the latches being shown in the unlatched position.
Figure 17:
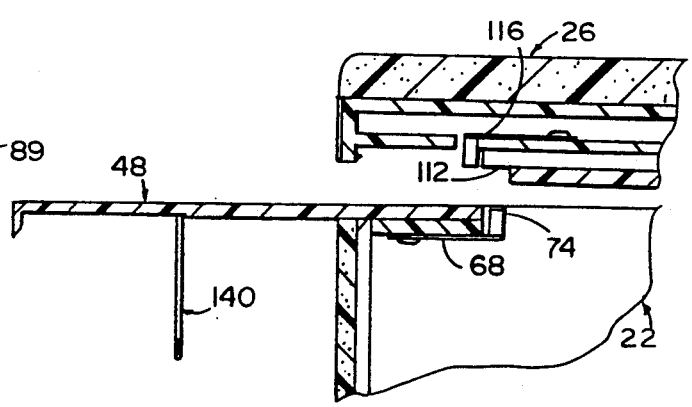
FIG. 17 is a cross-sectional view comparable to that shown in FIG. 15, but with the drawer being shown in an extended use position and the cover being shown in a partially open position, the latches being shown in the latched position and holding the drawer in the extended position.

Cover 26 further includes latches for positively retaining drawer 28 to cover 26 when cover 26 is opened and drawer 26 is carried by the cover in a retracted storage position. These latches comprise a pair of spring-biased catches 116 and 118 (FIGS. 9 and 11). Catches 116 and 118 are attached to opposite sides of cover second wall 89 in recess 91 and operate similarly, and hence only catch 116 will be described hereinafter. Catch 116 (FIG. 11) includes a leaf spring 120 attached at one end by suitable fastening means to second wall 89 in recess 91 with a downwardly protruding catch tip 122 mounted on the free end of spring 120. Tip 122 extends through opening 124 in second wall 89 and extends downwardly below slot 108 so as to cover the end of slot 108. However, tip 122 has a width about equal to the width of slot 108 plus standoff 104, and is positioned so that a part of tip 122 engages guide 60 when cover 26 is closed (FIGS. 14 and 15). Hence, tip 122 is forced partially into opening 124 and exposes the end of slot 108 when cover 26 is closed, but covers the end of slot 108 when cover 26 is opened (FIG. 17). Thus, with drawer 26 in the retracted use position and cover 26 opened, cover latch tips 122 move to engage the forward edges of tabs 132 for holding the drawer within slots 108, 110 by blocking the exit of tabs 132 from slots 108, 110. Alternatively, with cover 26 closed, tips 122 are raised by guides 60 and 62 to allow drawer 26 to be withdrawn from the armrest to a use position. Catch 118 includes a tip 123 that corresponds to tip 122 of catch 116.

Thus, drawer 26 is positively held whenever cover 26 is opened, regardless of the position of drawer 26. Alternatively, as noted above, when cover 26 is closed, latch tips 74, 75 and 122, 123 are depressed out of the way, thus allowing tabs 132 to move past them, and the drawer to move freely between use and storage positions on the base 22 and cover 26, respectively.

In use, drawer 28 (FIGS. 12 and 14) is most typically in the retracted storage position so that it is retained in cover 26. In particular, tabs 132 and drawer side edges 133 are located in slots 108, 110. With cover 26 closed, the forward end of standoffs 104, 106 contact and depressingly release catch tips 74 and guides 60, 62 contact and depressingly release catch tips 122 so that drawer 28 can be freely moved forwardly to an extended use position, or rearwardly to a retracted storage position. Also in the storage position, bail 140 is held in a folded storage position adjacent drawer body 126 with arms 144, 146 held partially in slots 108, 110.

When cover 26 is opened with drawer 28 in the retracted storage position, the drawer 28 is thus automatically retained to cover 26. As cover 26 is opened, catch tips 122 and 123 are released to an extended position to cover slots 108, 110, thus acting to positively retain drawer 28 in cover 26 by blockingly holding tabs 132 within slots 108, 110. When cover 26 is opened while drawer 28 is in the extended use position, catch tips 74 are released to an extended position blocking drawer tabs 132 in the forward use position and drawer 26 is automatically retained to base 22. When in the extended use position, hook-like tab 134 engages with rear lip 49 of platform 48, and thus drawer 28 is positively and securely held in the extended use position.

Thus, the system of the present invention provides a useful holder for containers or the like, the holder being transferably mounted between an armrest base and cover such that the container holder moves with the cover when in a storage position, but releases from the cover and is securely held to the base when extended to a use position. By this arrangement, the cover can be opened and the compartment in the armrest can be fully accessed for use regardless of the position of the container holder. Though only one embodiment is shown, it will become apparent to those of ordinary skill in the art that various modifications to the preferred embodiment of the invention can be made without departing from the spirit or scope thereof as defined by the appended claims.

The embodiments of the invention in which an exclusive property or privilege is claimed are defined as follows.

1. A vehicle accessory comprising:
 a base defining an open compartment and adapted to be mounted to a vehicle;
 a cover movably mounted to said base and movable between a closed position covering said compartment and an open position uncovering said compartment;
 a drawer operably connected to said base and said cover, said drawer being slideably movable between a retracted storage position and an extended use position relative to said base when said cover is in said closed position;
 first engaging means coupled to said cover for retaining said drawer to said cover when said drawer is in said storage position, said first engaging means releasing said drawer from said cover as said drawer is moved to said use position; and
 second engaging means coupled to said base for retaining said drawer to said base when said drawer is in said use position, said second engaging means releasing said drawer from said base as said drawer is moved to said storage position.

2. The apparatus as defined in claim 1 including latching means for holding said drawer in one of said use and storage positions when said cover is moved from said closed position.

3. The apparatus as defined in claim 2 wherein said drawer includes aperture means for holding a container.

4. The apparatus as defined in claim 3 wherein said first engaging means includes first slots in one of said cover and said drawer, and further includes laterally extending first tab means on the other of said cover and said drawer for engaging said first slots when said drawer is in said storage position.

5. The apparatus as defined in claim 4 wherein said second engaging means includes a second slot in one of said base and said drawer, and further includes laterally extending second tab means in the other of said base and said drawer for engaging said second slot when said drawer is in said use position.

6. The apparatus as defined in claim 5 wherein said drawer includes opposing sides including said first tab means and further includes a rearward end including said second tab means.

7. The apparatus as defined in claim 6 wherein said latching means includes at least one catch movable between a latched position for retaining said drawer in one of said use and storage positions, and an unlatched position for allowing said drawer to be moved between said use position and said storage position, and biasing means for biasing said catch into said latched position, said cover and said base including release means to move said at least one catch to said unlatched position as said cover is moved to said closed position.

8. The apparatus as defined in claim 1 wherein said drawer includes aperture means for holding a container.

9. The apparatus as defined in claim 1 wherein said first engaging means includes first slots in one of said cover and said drawer, and further includes laterally extending first tab means in the other of said cover and said drawer for engaging said first slots when said drawer is in said storage position.

10. The apparatus as defined in claim 1 wherein said second engaging means includes a second slot in one of said base and said drawer, and further includes laterally extending second tab means in the other of said base and said drawer for engaging said second slot when said drawer is in said use position.

11. The apparatus as defined in claim 1 wherein said cover includes opposing sides defining opposing slots and said drawer includes opposing sides including first tab means for engaging said opposing slots when said drawer is in said storage position, and wherein said base includes a rearwardly extending shelf and said drawer includes a rearward end including a hook-like tab for engaging said shelf when said drawer is in said use position.

12. The apparatus as defined in claim 1 including a latching means that includes a catch movable between a latched position for retaining said drawer in one of said use and storage positions, and an unlatched position for allowing said drawer to be moved from said one position, and further including a biasing means for biasing said catch into said latched position, said cover engaging said catch to move said catch to said unlatched position as said cover is moved to said closed position.

13. The apparatus as defined in claim 1 wherein said accessory comprises an armrest.

14. A container holder for a vehicle comprising:
a stationary component adapted to be mounted in a vehicle;
a movable member pivotally mounted to said stationary component and movable between a closed position against said stationary component and an open position;
a container holder including aperture means for holding a container, said container holder being transferably slideably mounted between said stationary component and said movable member and being movable between a retracted storage position and an extended use position, said container holder including first engaging means for retaining said container holder to said stationary component when in said extended use position and second engaging means for retaining said container holder to said movable member when in said storage position.

15. The apparatus as defined in claim 14 including latching means for holding said container holder in one of said extended use position or said retracted storage position when said movable member is moved from said closed position, said latching means being released when said movable member is in said closed position.

16. The apparatus as defined in claim 15 wherein said latching means includes a catch movable between a latched position for retaining said container holder in one of said use position or said storage position, and an unlatched position for allowing said container holder to be moved from said one position, and a biasing means for biasing said catch into said latched position, said movable member causing said catch to move to said unlatched position as said movable member is moved to said closed position.

17. The apparatus as defined in claim 14 wherein said first engaging means includes first slots in one of said movable member and said container holder, and further includes laterally extending first tab means in the other of said movable member and said container holder for engaging said first slots when said container holder is in said storage position.

18. The apparatus as defined in claim 17 wherein said second engaging means includes a second slot in one of said stationary component and said container holder, and further includes laterally extending second tab means in the other of said stationary component and said container holder for engaging said second slot when said container holder is in said use position.

19. The apparatus as defined in claim 14 wherein said movable member includes opposing sides defining opposing slots and said container holder includes opposing sides including first tab means for engaging said opposing slots when said container holder is in said storage position, and wherein said stationary component includes a rearwardly extending shelf and said container holder includes a rearward end including a hook-like tab for engaging said shelf when said container holder is in said use position, said first tabs forming a part of said first engaging means and said hook-like tab forming a part of said second engaging means.

20. An armrest for a vehicle including:
a base defining an upwardly open compartment, said base including a horizontally oriented lip extending partially into said open compartment;
a cover pivotally mounted to said base and movable between a closed position covering said compartment and an open position uncovering said compartment, said cover including a lower side that mateably closes into said compartment, said lower side including slot means therein;

a drawer including aperture means for holding a container, said drawer being transferably slideably mounted between said base and said cover and being movable between a retracted storage position and an extended use position, said drawer including first tab means for engaging said slot means on said cover when in said retracted storage position and including second tab means for engaging said horizontally oriented lip on said base when in said extended use position; and latching means for holding said drawer in said extended use position or in said retracted storage position when said cover is moved from said closed position, said latching means being released when said cover is in said closed position.

21. The apparatus as defined in claim 20 wherein said latching means includes a catch movable between a latched position for retaining said drawer in one of said use position or said storage position, and an unlatched position for allowing said drawer to be moved from said one position, and a biasing means for biasing said catch into said latched position, said movable cover including release means for causing said catch to move to said unlatched position as said cover is moved to said closed position.

* * * * *

UNITED STATES PATENT AND TRADEMARK OFFICE
CERTIFICATE OF CORRECTION

PATENT NO. : 5,316,368
DATED : May 31, 1994
INVENTOR(S) : Thomas E. Arbisi

It is certified that error appears in the above-indentified patent and that said Letters Patent is hereby corrected as shown below:

Column 5, line 28;
Before "released" insert --75--.

Signed and Sealed this

Seventh Day of March, 1995

Attest:

BRUCE LEHMAN

Attesting Officer     Commissioner of Patents and Trademarks